(12) United States Patent
Lee et al.

(10) Patent No.: US 9,015,137 B2
(45) Date of Patent: *Apr. 21, 2015

(54) CREATING AND MAINTAINING ORDER OF A LOG STREAM

(75) Inventors: Stephanie H. Lee, Saratoga, CA (US); David L. Levish, San Jose, CA (US); Ronald E. Parrish, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 425 days.

This patent is subject to a terminal disclaimer.

(21) Appl. No.: 13/450,337

(22) Filed: Apr. 18, 2012

(65) Prior Publication Data

US 2012/0203805 A1    Aug. 9, 2012

Related U.S. Application Data

(63) Continuation of application No. 12/904,026, filed on Oct. 13, 2010.

(51) Int. Cl.
*G06F 17/30*     (2006.01)
(52) U.S. Cl.
CPC ............................. *G06F 17/30368* (2013.01)
(58) Field of Classification Search
CPC ................................................ G06F 17/30368
USPC ........................................ 707/634, 704, 822
See application file for complete search history.

(56) References Cited

U.S. PATENT DOCUMENTS

| | | | | |
|---|---|---|---|---|
| 5,043,866 A * | 8/1991 | Myre et al. | ............................. | 1/1 |
| 5,455,946 A * | 10/1995 | Mohan et al. | ......................... | 1/1 |
| 5,581,750 A * | 12/1996 | Haderle et al. | ........................ | 1/1 |
| 5,933,838 A * | 8/1999 | Lomet | .................................. | 1/1 |
| 6,490,594 B1 * | 12/2002 | Lomet | .................................. | 1/1 |
| 7,219,262 B2 | 5/2007 | Miller et al. | | |
| 7,483,911 B2 | 1/2009 | Cherkauer | | |
| 7,689,626 B2 | 3/2010 | Miller et al. | | |
| 8,090,691 B2 * | 1/2012 | Lynn | ............................. | 707/648 |
| 2003/0009477 A1 | 1/2003 | Wilding et al. | | |
| 2006/0020634 A1 * | 1/2006 | Huras et al. | .................. | 707/200 |
| 2008/0133615 A1 | 6/2008 | Bradshaw et al. | | |
| 2008/0162084 A1 | 7/2008 | Bower et al. | | |
| 2008/0208924 A1 | 8/2008 | Bradshaw et al. | | |
| 2009/0089339 A1 | 4/2009 | Mitchell et al. | | |
| 2009/0240739 A1 | 9/2009 | Bhatt et al. | | |
| 2010/0036861 A1 | 2/2010 | Srihari et al. | | |
| 2011/0131186 A1 * | 6/2011 | Whisenant | .................... | 707/672 |

OTHER PUBLICATIONS

Preliminary Amendment, Apr. 18, 2012, for U.S. Appl. No. 12/904,026, filed Oct. 13, 2010 by S.H. Lee et al., Total 6 pp.

(Continued)

*Primary Examiner* — Shew-Fen Lin
(74) *Attorney, Agent, or Firm* — Janaki K. Davda; Konrad, Raynes, Davda & Victor LLP

(57) ABSTRACT

Provided are techniques for using a series of compare and swap operations to assign a Relative Byte Address (RBA) and a Logical Record Sequence Number (LRSN) to a log record. One or more log buffers for storing the log record are identified, and the log record is moved to the one or more log buffers.

7 Claims, 13 Drawing Sheets

(56) References Cited

OTHER PUBLICATIONS

U.S. Appl. No. 12/904,026, filed Oct. 13, 2010, entitled "Creating and Maintaining Order of a Log Stream Without Use of a Lock or Latch" invented by Lee, S.H., D.L. Levish, and R.E. Parrish, Total 38 pp.

Wang, J. and Y. Hu, "A Novel Reordering Write Buffer to Improve Write Performance of Log-Structured File Systems", © 2003 IEEE, Total 14 pp (Also IEEE Transactions on vol. 52, Iss. 12, Dec. 2003).

U.S. Appl. No. 12/904,026, filed Oct. 13, 2010, entitled "Creating and Maintaining Order of a Log Stream Without Use of a Lock or Latch", invented by Lee, S.H., D.L. Levish, and R.E. Parrish, Total 38 pp.

Wang, R., B. Salzberg, and D. Lomet, "Transaction Support for Log-Based Middleware Server Recovery", © 2009 IEEE, Total 4 pp (Also ICDE IEEE International Conference on Mar. 29, 2009-Apr. 2, 2009).

Amendment 1, Sep. 26, 2012, for U.S. Appl. No. 12/904,026, filed Oct. 13, 2010 by S.H. Lee et al., Total 10 pp.

Office Action 1, Jun. 29, 2012, for U.S. Appl. No. 12/904,026, filed Oct. 13, 2010 by S.H. Lee et al., Total 20 pp.

Amendment 2, Mar. 27, 2013, for U.S. Appl. No. 12/904,026, filed Oct. 13, 2010 by S.H. Lee et al., Total 12 pp.

Final Office Action 1, Jan. 2, 2013, for U.S. Appl. No. 12/904,026, filed Oct. 13, 2010 by S.H. Lee et al., Total 17 pp.

Notice of Allowance 1, Nov. 26, 2014, for U.S. Appl. No. 12/904,026, filed Oct. 13, 2010 by S.H. Lee et al., Total 16 pp.

\* cited by examiner

CREATING AND MAINTAINING ORDER OF A LOG STREAM

CROSS-REFERENCE TO RELATED APPLICATIONS

This application is a continuation of and claims the benefit of U.S. patent application Ser. No. 12/904,026, filed Oct. 13, 2010, which application is incorporated herein by reference in its entirety.

BACKGROUND

1. Field

Embodiments of the invention relate to creating and maintaining an order of a log stream without the use of a lock or latch.

2. Description of the Related Art

Databases store and retrieve data. Relational databases are organized into tables that consist of rows and columns of data. The rows may be called tuples or records or rows. A database typically has many tables, and each table typically has multiple records and multiple columns.

A table in a database can be accessed using an index. An index is an ordered set of references (e.g., pointers) to the records in the table. The index is used to access each record in the table using a key (i.e., one of the fields or attributes of the record, which corresponds to a column). The term "key" may also be referred to as "index key". Without an index, finding a record may require a scan (e.g., linearly) of an entire table. Indexes provide an alternate technique to accessing data in a table. Users can create indexes on a table after the table is built. An index is based on one or more columns of the table. Also, a table may use hashing or some other mechanism that eliminates the need for an index.

A query may be described as a request for information from a database based on specific conditions. A query typically includes one or more predicates. A predicate may be described as an element of a search condition that expresses or implies a comparison operation (e.g., A=3).

Database systems provide for data consistency, transaction commit and abort, and recoverability in the event of a failure log changes made to database objects (e.g., tables). When a database system allows for concurrency of updates, the component responsible for managing the logged data determines how the log records are sequenced so that each log record can be uniquely identified and found. The simplest way to accomplish this is for the log managing component to serialize all requests to write a log record so that at any given moment in time only one log record is being added to the stream of log records. Typically, this serialization is facilitated through means of a lock or latch or similar mechanism (henceforth referred to generically as a latch). However, this level of serialization can become a bottleneck to all transactions making database updates.

In order to avoid this bottleneck, conventional systems offer various techniques. A first technique is using a single sequence number that is unique and not having to worry about the exact physical ordering of the log records. This makes the serialization very simple at the expense of making it difficult to find a particular log record. A second technique queues all requests to a single execution unit with the possibility of putting the entire log record on the queue. The advantages and disadvantages are similar to the first technique. A third technique reserves ranges of log records for multiple execution units and merges the records together at a later time. The complication again comes when an individual log record needs to be located for some purpose. Other techniques use variations on the first, second, and third techniques.

Some conventional systems rely on exact sequencing of the log records in the physical stream of log records. The Relative Byte Address (RBA) of a log record, which is an address relative to the beginning of the log stream, and the Logical Record Sequence Number (LRSN) are both increasing, although there could be multiple log records with the same LRSN value that only have increasing RBA values. The exact sequencing makes it very easy to locate a log record, but imposes limitations on the serialization technique used to place an individual log record in the stream of log records. In addition, the necessity of having to control Input/Output (I/O) of the log stream at the block level, which is often not necessary for some database systems, induces further complications and additional structures that need to be properly updated and kept in sequence. For this reason, and due to the desire to have the expense of placing the log record in the log stream charged to the requesting application, some conventional systems have serialized all requests so that the contention is on a single latch that controls the creation of the log stream.

Thus, there is a need for creating and maintaining the order of a log stream without the use of a lock or latch.

BRIEF SUMMARY

Provided are a method, computer program product, and system for using a series of compare and swap operations to assign a Relative Byte Address (RBA) and a Logical Record Sequence Number (LRSN) to a log record. One or more log buffers for storing the log record are identified, and the log record is moved to the one or more log buffers.

BRIEF DESCRIPTION OF THE SEVERAL VIEWS OF THE DRAWINGS

Referring now to the drawings in which like reference numbers represent corresponding parts throughout:

FIG. 3 is formed by FIGS. 3A, 3B, 3C, 3D, and 3E.

FIG. 4 is formed by FIGS. 4A and 4B.

FIG. 5 is formed by FIGS. 5A and 5B.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

With a series of atomic updates, properly sequenced and with retry logic to deal with failed attempts, embodiments create a log stream that does not rely on a single latch to provide the serialization needed to maintain the proper sequencing of log records in the log stream.

Figure 1:
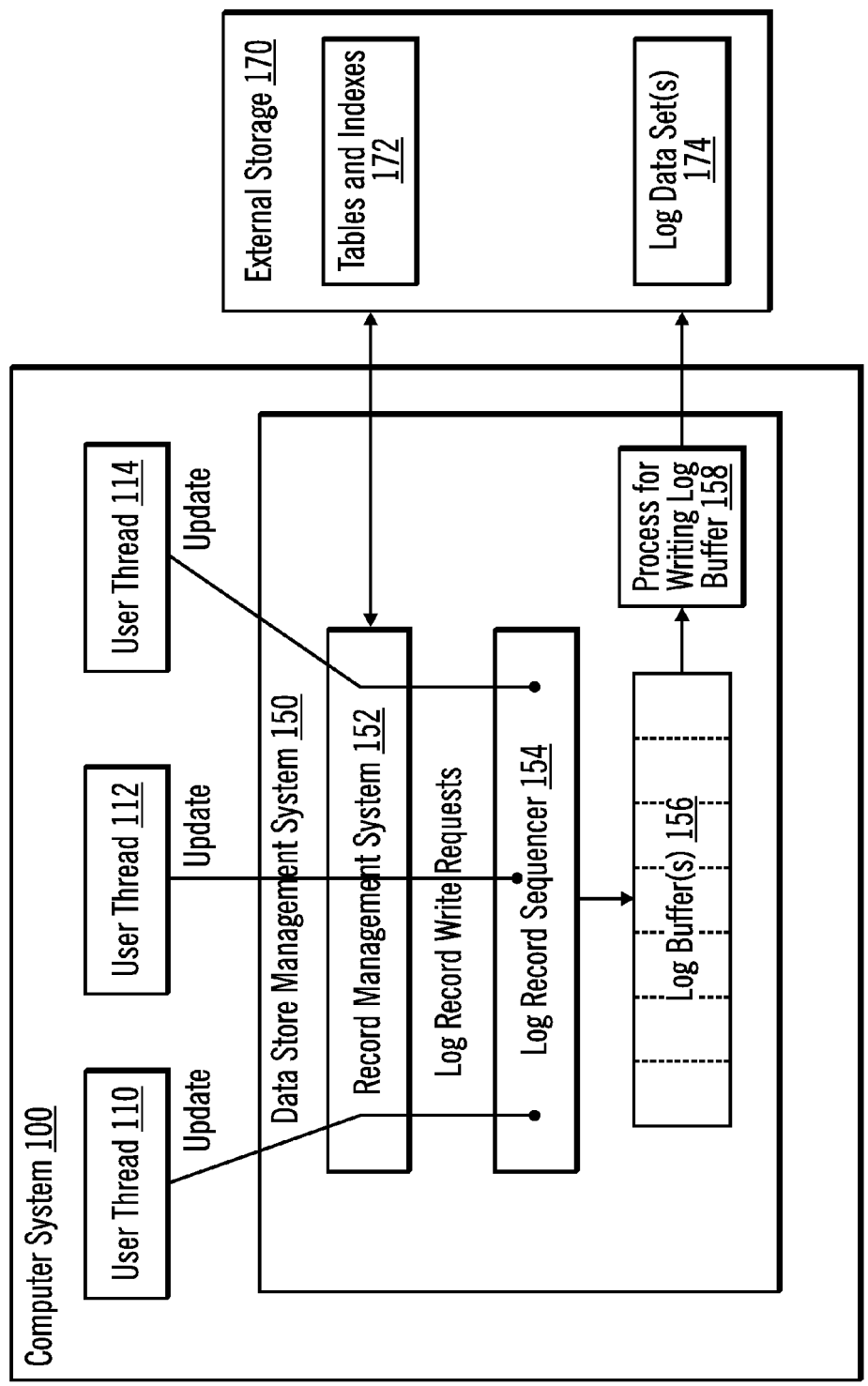
FIG. 1 illustrates, in a block diagram, a computer architecture in accordance with certain embodiments.

FIG. 1 illustrates, in a block diagram, a computer architecture in accordance with certain embodiments. In FIG. 1, a computer system 100 includes a data store management system 150. In certain embodiments, the data store management system 150 is an RDBMS. In certain alternative embodiments, the data store management system is a non-relational database. User threads 110, 112, 114 (e.g., execution units) may represent applications and issue updates to the record management system 152. The record management system 152 updates tables and/or indexes 172 stored in external storage 170 and issues log write requests to the log record sequencer 154 to record the changed data. The log record sequencer 154 writes to one or more log buffers 156. A process for writing the log buffer 158 moves the contents of a log buffer 156 to one or more log data sets 174 in external storage 170. The process 158 may be synchronous or asynchronous in various embodiments.

Figure 2:
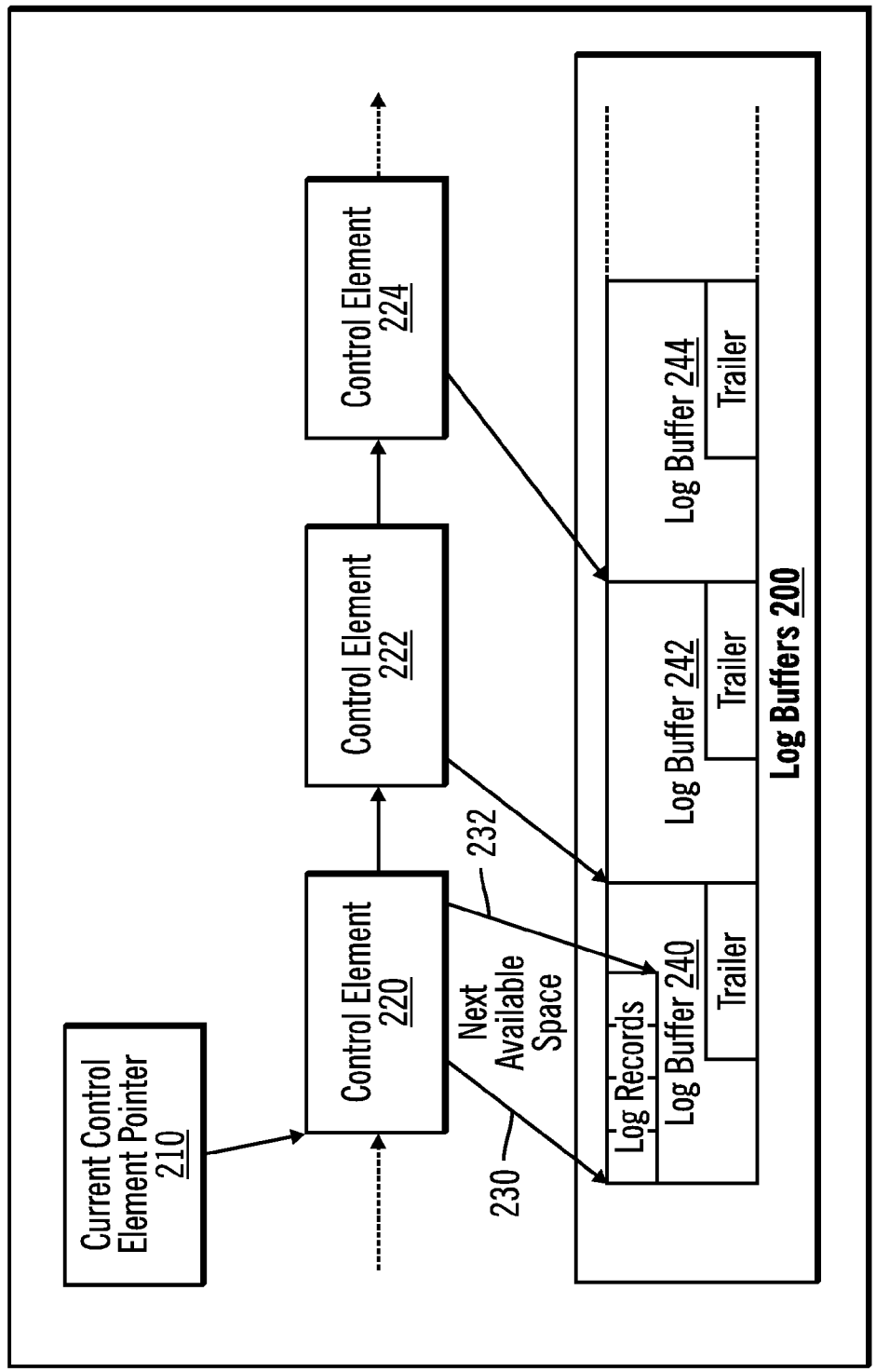
FIG. 2 illustrates, in a block diagram, log buffers and metadata blocks in accordance with certain embodiments.

FIG. 2 illustrates, in a block diagram, log buffers and metadata blocks in accordance with certain embodiments. In FIG. 2, the log buffer 200 may be described as including log buffers 240, 242, 244. That is, the log buffers 240, 242, 244 may be described as holding log records that are actually written to external storage 170. These individual log buffers are part of the larger log buffer 200. In certain embodiments, the log buffers 200 is an example of log buffers 156. Log buffer 240 includes log records of different sizes. The log buffers 240, 242, 244 have associated blocks called control elements or control blocks, such as control elements 220, 222, 224, which may form a circular linked list or other connected structure. Each buffer is an allocated piece of storage with some structure associated with the block. In this context, a block refers to an individual control element. The control elements contain the ephemeral metadata for the corresponding log buffer and not the log data itself. The dashed arrow pointing to control element 220 indicates that there may be another control element (not shown) pointing to control element 220. Each control element 220, 222, 224 maintains metadata about the corresponding log buffer 240, 242, 244. In certain embodiments, the metadata in the control element 220, 222, 224 is not written to external storage as the metadata is applicable when the log buffer is in memory. The metadata in the control element 220, 222, 224 includes a use count and indicators for additional metadata. For example, indicators may indicate whether or not a log buffer is full or whether a log buffer contains part of a spanned log record (i.e., a log record that is too large to reside in a single log buffer and therefore spans multiple log buffers).

In FIG. 2, a current control element pointer 210 points to the control element 220. The control element 220 has a first pointer 230 to the beginning of a log buffer and a second pointer 232 to a next available space. As log records are stored in a log buffer, the second pointer changes to point to the new, next available space. Each log record includes a log record header (sometimes referred to as LRH) and the data of the log record ("log record data"). The log record header contains, among other information, the Relative Byte Address (RBA) and the Logical Record Sequence Number (LRSN).

In certain embodiments, the LRSN is based on a time stamp. Because multiple systems updating the same data are required to have synchronized clocks, the LRSN can be used to sequence the log records from multiple systems in chronological order. This creates a requirement in some situations that the LRSN generated for a particular log record must be greater than an existing value. In such a situation, the log record sequencer 154 may impose a delay so that the time-based LRSN will increase before the log record is placed in the log stream.

Each log buffer 240, 242, 244 consists of log record data, which may be an entire log record, multiple log records or part of a single log record followed by a trailer that contains information about the log buffer 240, 242, 244. The trailer contains, among other information, the RBA of the beginning of the log buffer 240, 242, 244 and the LRSN of the last log record in the log buffer 240, 242, 244. If there is one log record or part of one log record in the log buffer 240, 242, 244, the trailer contains the LRSN of that log record.

In certain embodiments, the log buffer 156 is in memory. The entire contents of the log buffer 240, 242, 244 are written to external storage 170 (e.g., disk) as a single unit, and the size of an individual log buffer 240, 242, 244 is the size of a physical block on the external storage 170, at least as the physical block appears to the system or application initiating the I/O operation. Certain modern disk subsystems emulate the physical blocks expected by the system or application initiating the I/O operation, and the actual implementation is typically an array of multiple disks that write in fixed block sizes that are not visible outside of the disk subsystem.

Compare and swap operations are a way of atomically updating the memory so that multiple concurrent user threads 110, 112, 114 can ensure that the update they intend to do is performed and not regressed by another user thread that requests an update to the same storage at the same time. In certain embodiments, the compare and swap is a hardware instruction and is implemented by using any of the following instructions, generically referred to as Compare and Swap or CS: Compare and Swap 32-bit (CS), Compare Double and Swap 32-bit (CDS), Compare and Swap 64-bit (CSG), Compare Double and Swap 64-bit (CDSG). The compare and swap may refer to several instructions that set values in a recovery tracking area in addition to doing the compare and swap for the value explicitly mentioned.

The process of writing a log record to the log stream involves invoking the log manager, performing serialization to assign the RBA and LRSN to the log record, moving the log record into the buffer, updating the control element, and, if needed, updating the information in the log buffer trailer. Instead of performing these operations while holding a latch, embodiments use a series of compare and swap operations, with appropriate retries for failures of attempted compared and swap operations, until the RBA and LRSN values are assigned. The assigning of the RBA to a log record simultaneously calculates the next RBA to be used by the next log record to ensure that the next log record will not overwrite the current log record. The log record is then moved to one or more log buffers 156, and the log buffer trailer is updated, if needed, by means of another compare and swap operation.

The log stream is written to the external storage 170, usually asynchronously, by the process 158. Because the log stream is read in the event of a data store management system 150 failure, the log buffers 156 written to the external storage 170 contain complete log records only (i.e., there can not be some combination of complete log records and incomplete log records still being moved). A log buffer 156 is not necessarily full when the log buffer is written to the external storage 170, but the log buffer does consist of at least one complete log record. There are a number of stimuli that result in the write of log buffer 156 to external storage 170 (i.e., a physical write of the log buffer 156 is initiated).

An individual user thread may be interrupted at any time, introducing an unpredictable delay. For this reason, other user threads that started processing later may complete processing sooner, and the LRSN value is checked and possibly updated at multiple points.

Thus, embodiments accomplish operations without obtaining a latch and still maintain the integrity of the log stream, even if there is an unrecoverable failure in the process of creating the log record. An unrecoverable failure may be an invalid request to write a log record or a cancel initiated by some other user thread that occurs somewhere in the process of creating the log record.

The procedure of embodiments starts at a point where a request has been made to write a log and control has been transferred to the log manager. The retry points listed below may be part of the normal flow and are used as retry points if branched to from another location.

FIG. 3 illustrates, in a flow diagram, logic for a main log record management routine (MAIN) in accordance with certain embodiments. FIG. 3 is formed by FIGS. 3A, 3B, 3C, 3D, and 3E.

Control begins at block 300 with the log record sequencer 154 receiving a log write request. In block 302, the log record sequencer 154 creates a tracking area that is used to record events in the creation of the log record. In block 304, the log record sequencer sets up recovery that will get control in the event of an error or unexpected termination. Setting up such recovery is well known to one skilled in the art.

Figure 3A:
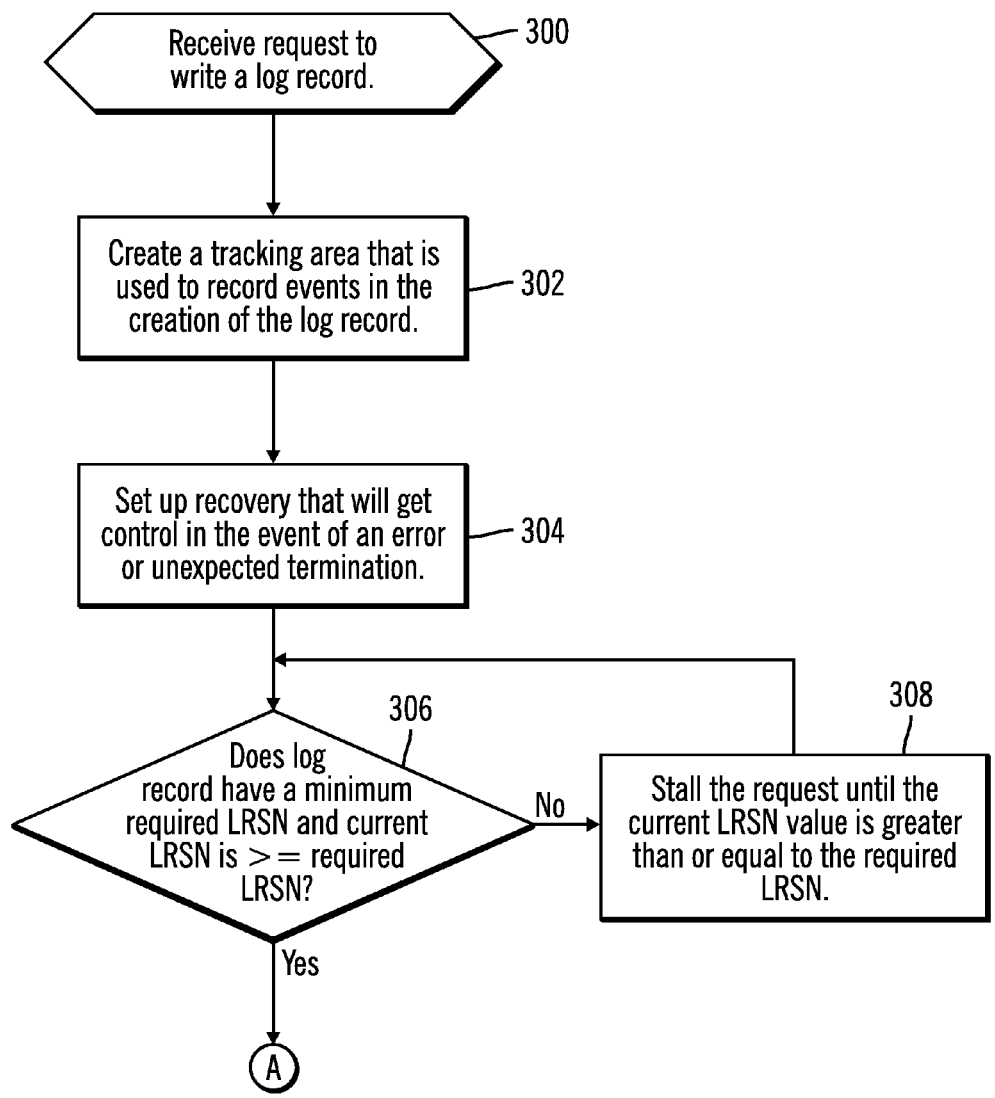
FIG. 3 illustrates, in a flow diagram, logic for a main log record management routine (MAIN) in accordance with certain embodiments.
Figure 3B:
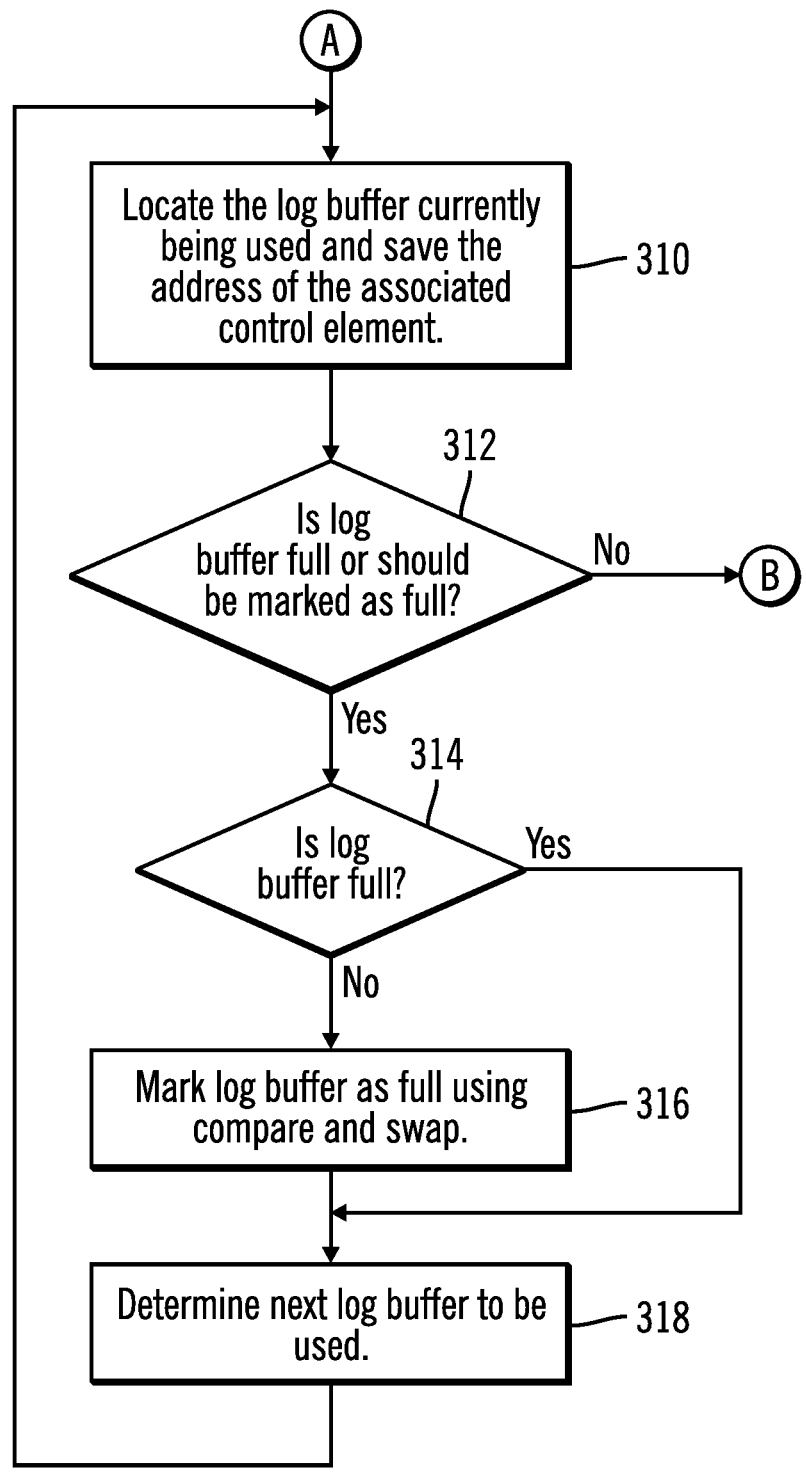
Figure 3C:
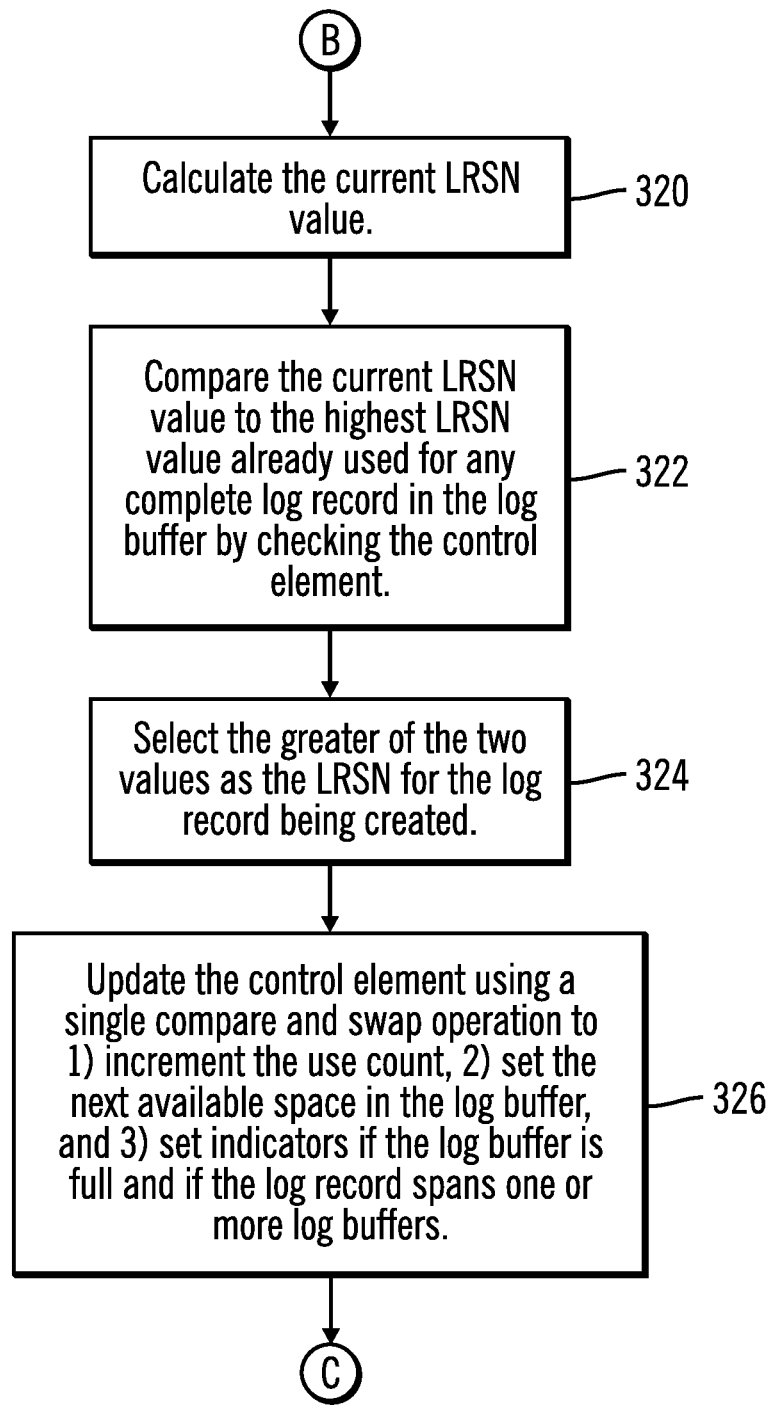

In different embodiments, a current LRSN is either generated or centrally stored. In certain embodiments, the LRSN is based off the time of day clock, so the current LRSN is generated at any moment in time. In other embodiments, the LRSN may be a number that is stored in some centralized location. In block 306, the log record sequencer 154 determines whether the log record has a minimum required LRSN (which is determined by the user thread, depending on the resource that the user thread is updating) and whether the current LRSN is greater than or equal to (">=") the required LRSN. The required LRSN may be described as the minimum LRSN as set by the caller. When the log record is created, the log record may or may not have a required minimum LRSN. Typically, log records that update data (e.g., tables or indexes) have minimum required LRSNs. Many other log records do not have minimum required LRSNs and will use the current LRSN as the minimum required LRSN. If the log record does not have a minimum required LRSN or if the current LRSN is greater than or equal to the required LRSN, processing continues to block 308, otherwise, processing continues to block 310 (FIG. 3B). In block 308, the log record sequencer 154 stalls the request until the current LRSN value is greater than or equal to the required LRSN and then returns to block 306. Thus, if the log record has a minimum required LRSN, the log record sequencer 154 ensures that the current LRSN is greater than or equal to the required LRSN.

From block 306, if the current LRSN is greater than or equal to the required LRSN, processing continues to block 310 (FIG. 3B). In block 310, the log record sequencer 154 locates the log buffer currently being used in log buffer 156 and saves the address of the associated control element. Block 310 may also be referred to as retry point 1. In block 312, the log buffer sequencer 154 determines whether the located log buffer is full or should be marked as full. In particular, the log buffer sequencer 154 determines that the log buffer 156 should be marked as full if the log record being put in the located log buffer 156 will not fit in the remaining space and there is not enough room to begin a log record that spans multiple log buffers 156. If the located log buffer is not full nor should be marked as full, processing continues to block 320 (FIG. 3C), otherwise, processing continues to block 314 from block 312. In block 314, if the current log buffer is full, processing goes to block 318. Otherwise, if the located log buffer should be marked as full, processing goes to block 316, where the log buffer sequencer 154 marks the located log buffer as full using compare and swap. In block 318, the log buffer sequencer 154 determines the next log buffer to be used. From block 318, processing continues to block 310.

In block 320 (FIG. 3C), the log record sequencer 154 calculates the current LRSN value. In block 322, the log record sequencer 154 compares the current LRSN value to the highest LRSN value already used for any complete log record in the log buffer by checking the control element. In block 324, the log record sequencer 154 selects the greater of the two values as the LRSN for the log record being created. Due to the fact that a user thread can be interrupted for an arbitrary amount of time, embodiments check several times that the LRSN value is acceptable (i.e., meets the caller's requirement and never decreases from a LRSN used by a prior log record).

Figure 3D:
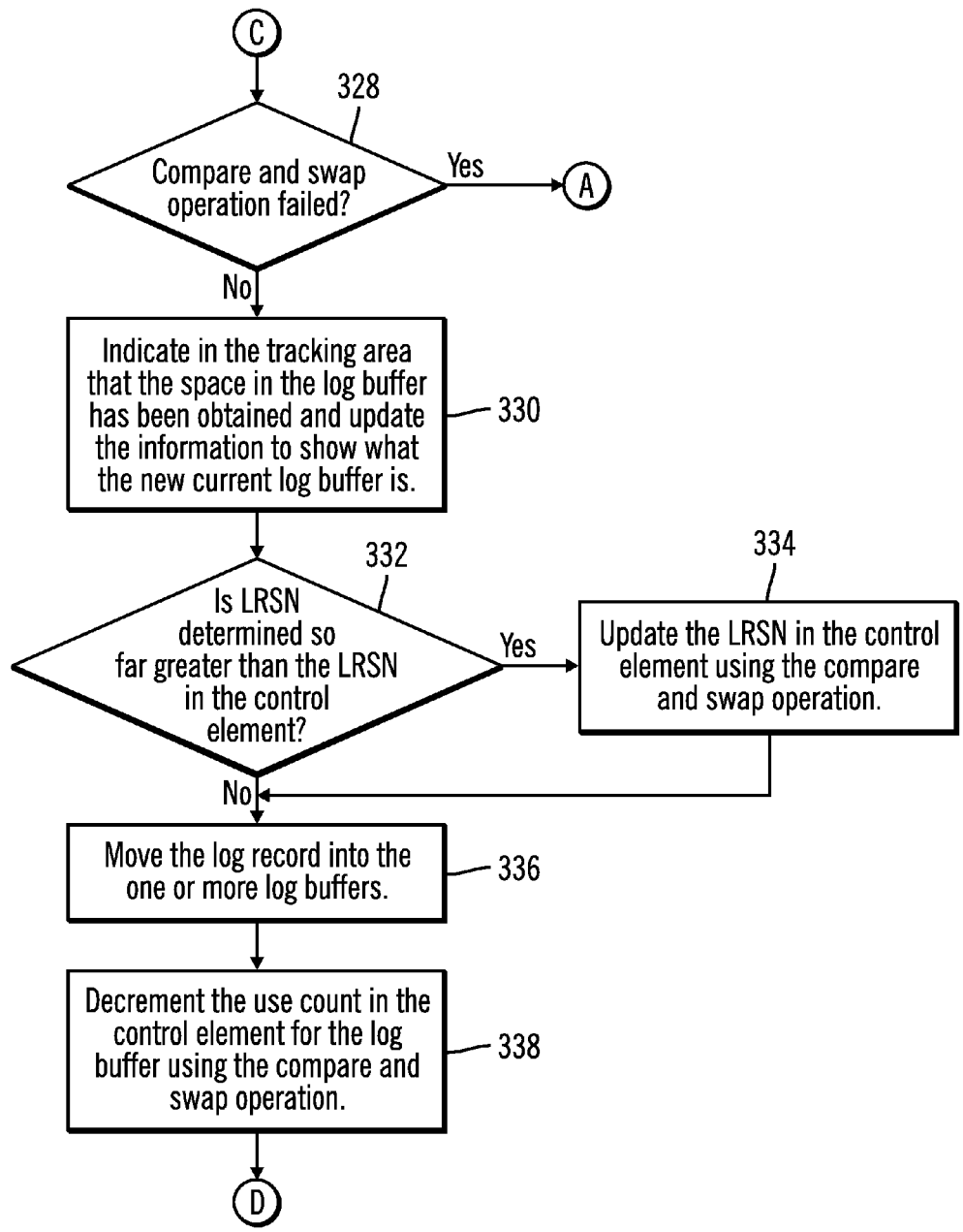

In block 326, the log record sequencer 154 updates the control element using a single compare and swap operation to 1) increment the use count, 2) set the next available space in the log buffer, and 3) set indicators if the log buffer is full and if the log record spans one or more log buffers. From block 326 (FIG. 3C), processing continues to block 328 (FIG. 3D). In block 328, the log record sequencer 154 determines whether the compare and swap operation in block 326 failed. If so, processing continues to block 310 (FIG. 3B), otherwise, processing continues to block 330. That is, if the compare and swap operation in block 326 failed, processing continues to retry point 1. If the compare and swap operation is successful, other requests will find the next available space in the current log buffer or that the log buffer is full and will go to find the next log buffer. In block 330, the log record sequencer 154 indicates in the tracking area that the space in the log buffer has been obtained and updates the information in the current control element pointer to show what the new current log buffer is (i.e., the log buffer that the current log record will end in). The tracking area may be described as unique to the user thread creating the log record. The tracking area is used to keep track of the changes that the user thread has made (if any) that may need to be used if recovery is invoked due to abnormal execution (e.g., cancel or unrecoverable error). The tracking area is set up just before recovery is set. When the space has been reserved for the log record, the RBA value can be determined by the location in the log buffer where the log record will start.

In block 332, the log record sequencer determines whether the LRSN determined so far is greater than the LRSN in the control element. If so, processing continues to block 334, otherwise, processing continues to block 336. The LRSN for the log record being written is the LRSN "determined so far". The possibility exists that the LRSN for the log record is fine, but, another log record is being written following the log record that this user thread is writing and that the other user thread has already updated the control element. Embodiments constantly deal with concurrency since there is no single lock or latch to prevent concurrency. In block 334, the log record sequencer 154 updates the LRSN in the control element using the compare and swap operation. From block 324, processing continues to block 336. In block 336, the log record sequencer 154 moves the log record into the one or more log buffers 154. In block 338, the log record sequencer 154 decrements the use count in the control element for the log buffer using the compare and swap operation.

Figure 3E:
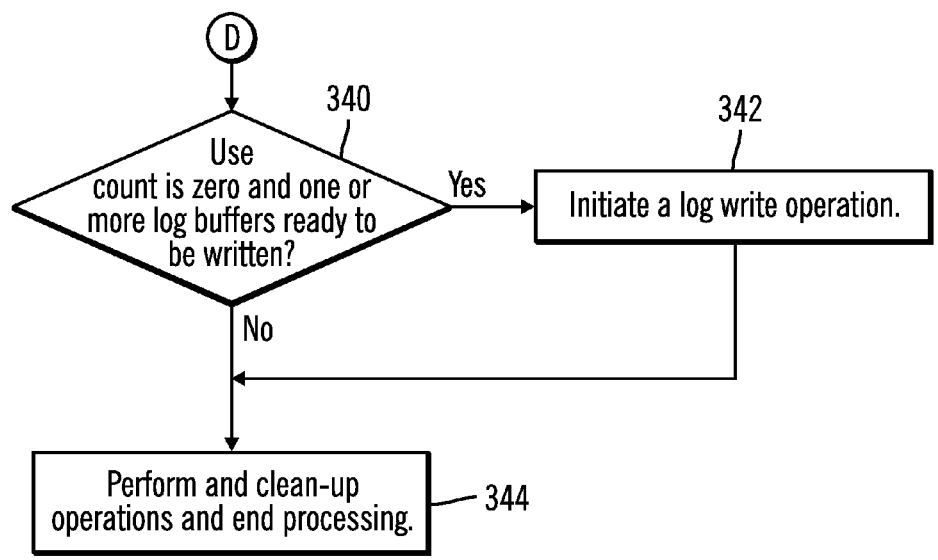

From block 338 (FIG. 3D), processing continue to block 340 (FIG. 3E). In block 340, the log record sequencer 154 determines whether the use count is zero and one or more log buffers are ready to be written. If so, processing continues to block 342, otherwise, processing continues to block 344. In block 342, the log record sequencer 154 initiates a log write operation to external storage 170. From block 342, processing continues to block 344. In block 344, the log record sequencer 154 performs clean-up operations and ends processing (i.e., exits).

Figure 4A:
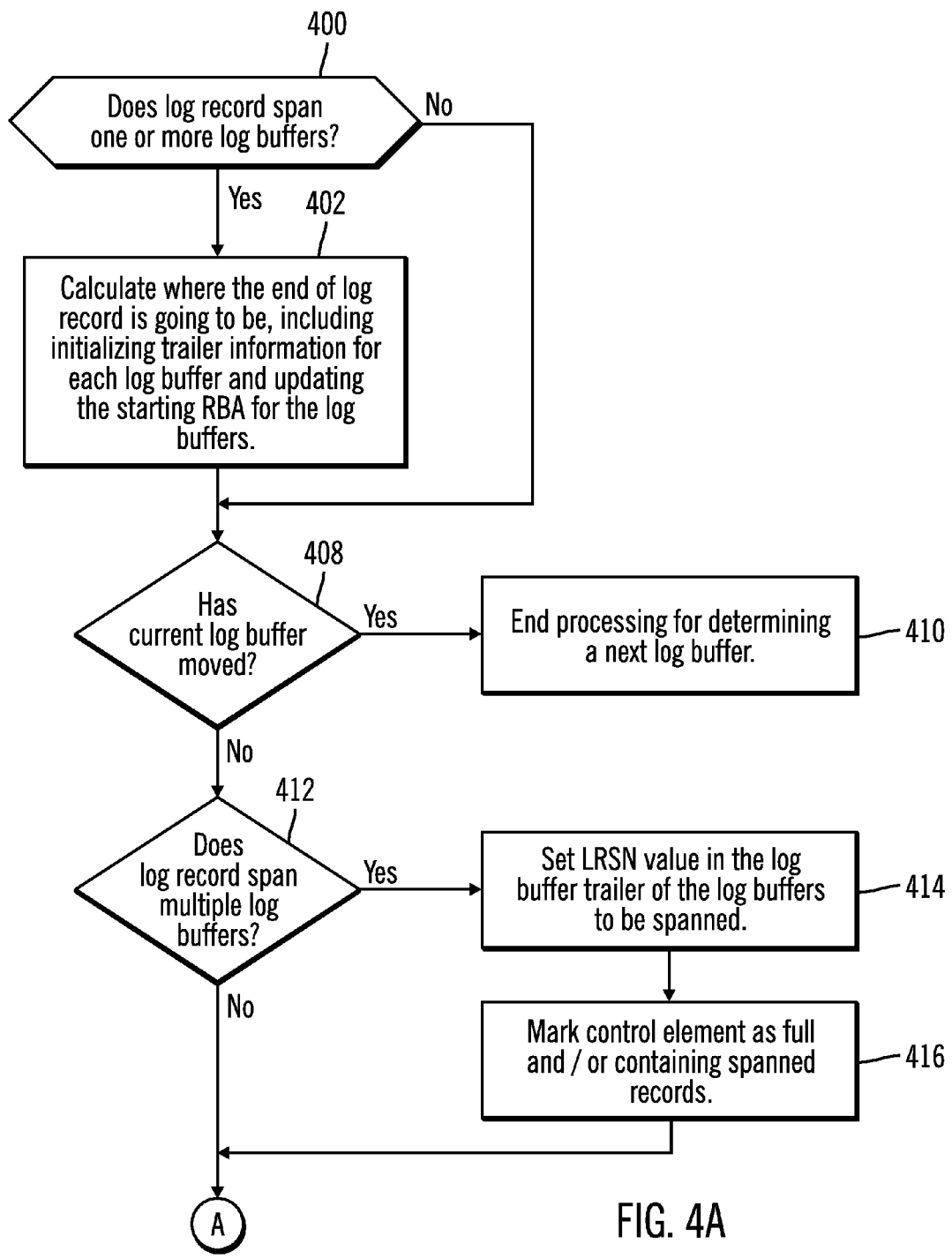
FIG. 4 illustrates, in a flow diagram, logic for determining a next buffer in accordance with certain embodiments.
Figure 4B:
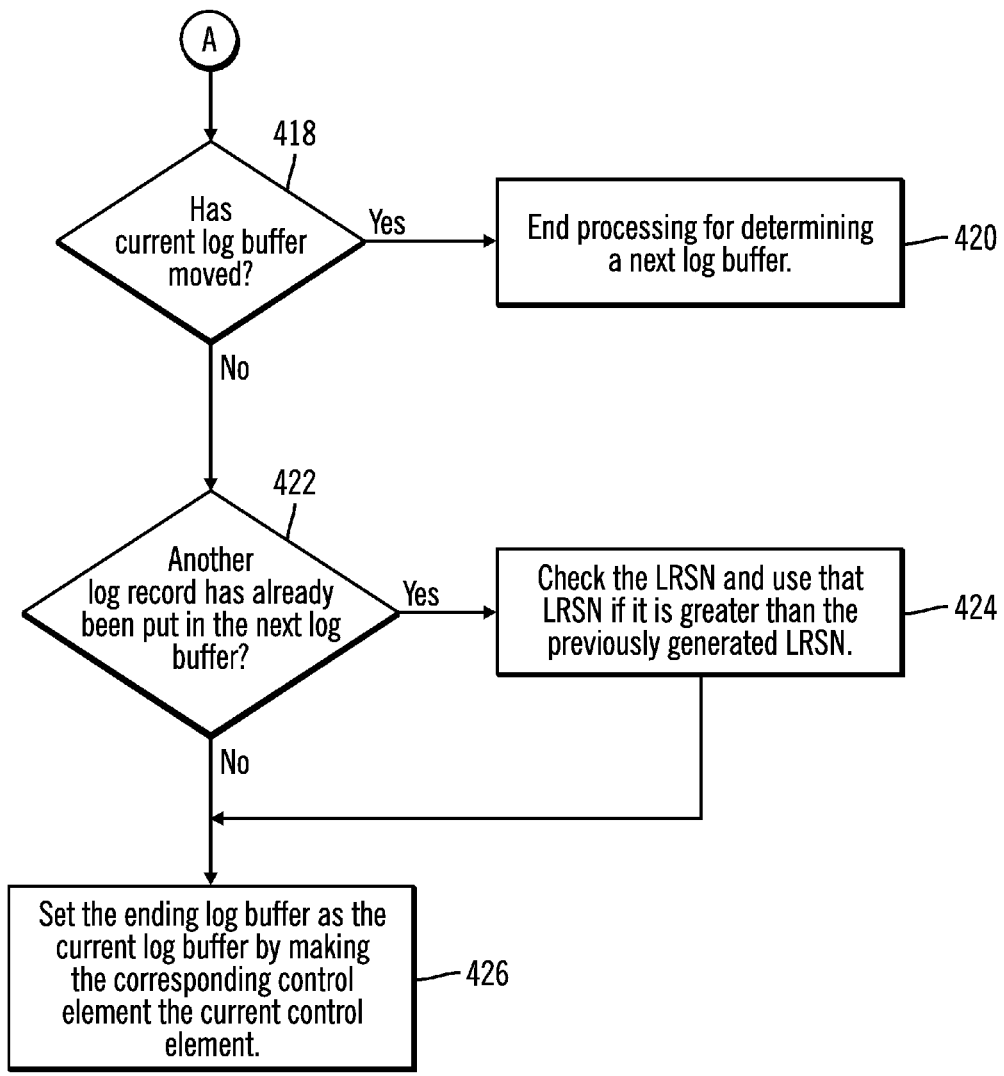

FIG. 4 illustrates, in a flow diagram, logic for determining a next buffer in accordance with certain embodiments. FIG. 4 is formed by FIGS. 4A and 4B. Control begins at block 400 with the log record sequencer 154 determining whether the log record spans one or multiple log buffers. If so, processing continues to block 402, otherwise, processing continues to block 408. In block 402, the log record sequencer 154 calculates where the end of the log record is going to be, including initializing trailer information for each log buffer and updating the starting RBA for the log buffers in corresponding control elements with a compare and swap operation. That is, since the log buffers are reused, determining the end also involves initializing the trailer information for each log buffer and updating the starting RBA for the log buffer in each of the control elements. Normally, if the compare and swap operation has failed, some processing is redone and the compare and swap operation is retried. In this case, if the compare and swap operation fails in block 402, some other user thread has done the same update that the current user thread is intending to do. Note that the compare and swap operation is not attempted if it is determined that some other user thread has already done the update. In particular, the log record sequencer 154 decides not to retry the compare and swap operation if the compare and swap operation fails because another user thread has done the initialization first, and the compare and swap operation should not be retried since it could overwrite the information set by the other user thread. From block 402, processing continues to block 408.

In block 408, the log record sequencer 154 determines whether the current log buffer has moved. This is another concurrency issue. Another user thread may have changed what the current log buffer is and updated the information in the current control element pointer 210. If so, processing continues to block 410, otherwise, processing continues to block 412. In block 410, if the current log buffer has moved, which is determined from the current control element, the log record sequencer 154 ends processing for determining the next log buffer. That is, the determination of whether the current log buffer has moved can be determined by checking what the current control element is. The determination of the next buffer can be retried from an appropriate point by the log record sequencer 154.

In block 412, the log record sequencer 154 determines whether the log record spans multiple buffers. If so, processing continues to block 414, otherwise, processing continues to block 418 (FIG. 4B). In block 414, the log record sequencer 154 sets the LRSN value in the log buffer trailer of the log buffers to be spanned. This sets a minimum allowable LRSN value for the log buffer. In block 416, the log record sequencer 154 marks the control element as full and/or containing spanned records. From block 416, processing continues to block 418 (FIG. 4B).

In block 418, the log record sequencer 154 determines whether the current log buffer has moved. This check is done again because another user thread my have claimed the one or more log buffers first. If so, processing continues to block 420, otherwise, processing continues to block 422. In block 420, if the current log buffer has moved, which is determined from the current control element, the log record sequencer 154 ends processing for determining the next buffer. The determination of the next buffer can be retried from an appropriate point by the log record sequencer 154. There may be enough room in the new current log buffer and the user thread may not have to go through this new log buffer determination.

In block 422, the log record sequencer 154 determines whether another user has already updated the control element put in the log buffer. If so processing continues to block 424, otherwise, processing continues to block 426. In block 424, the log record sequencer 154 checks if other control element needs to be updated and updates them as necessary (i.e., checks the LRSN and uses that LRSN if it is greater than the previously generated LRSN). After the updates, the process continues to block 426.

In block 426, when it has been determined where the current log record will end, the log record sequencer 154 sets the ending log buffer as the current log buffer by making the corresponding control element the current control element.

Figure 5A:
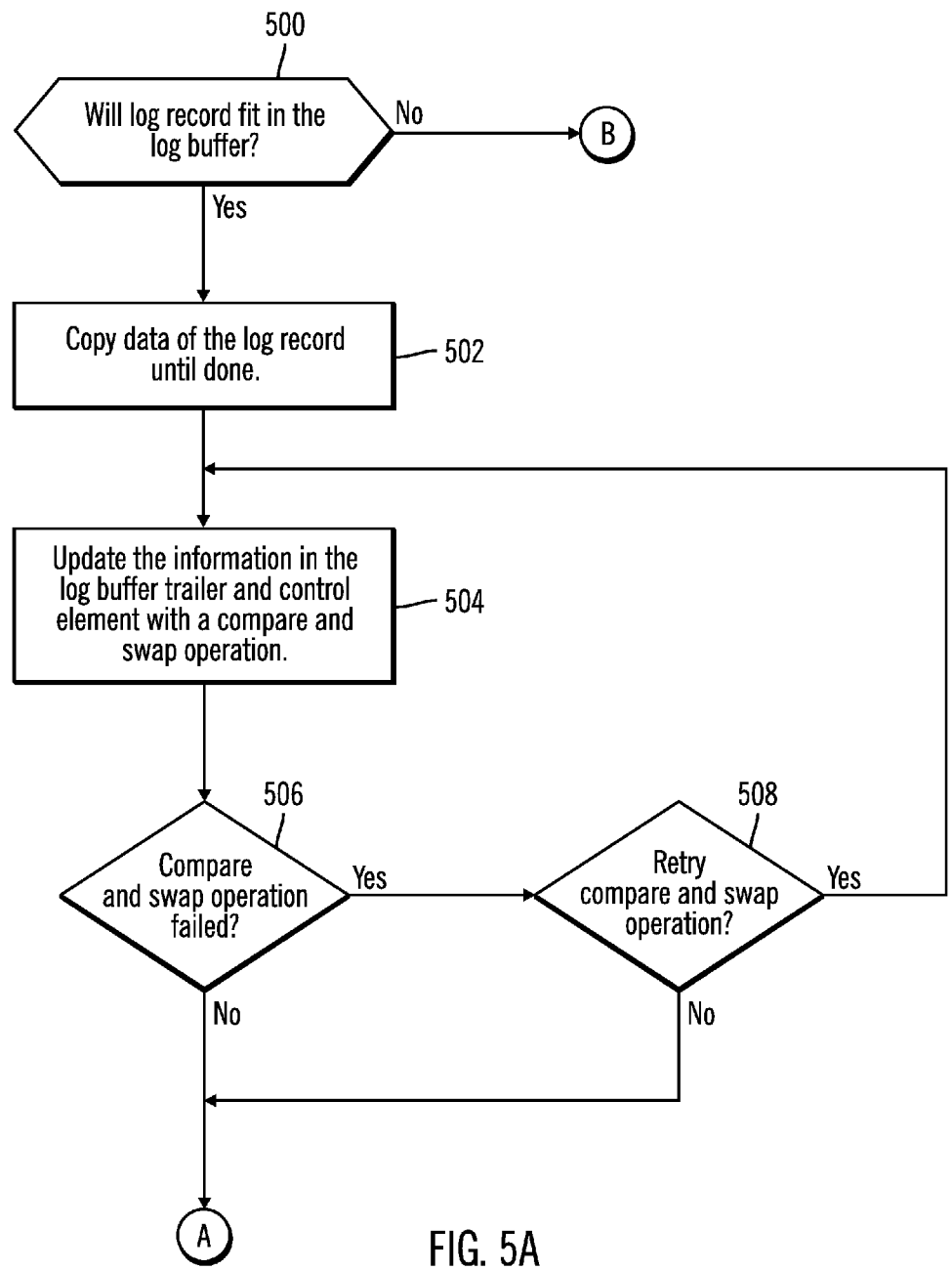
FIG. 5 illustrates, in a flow diagram, logic for moving a log record into a log buffer in accordance with certain embodiments.
Figure 5B:
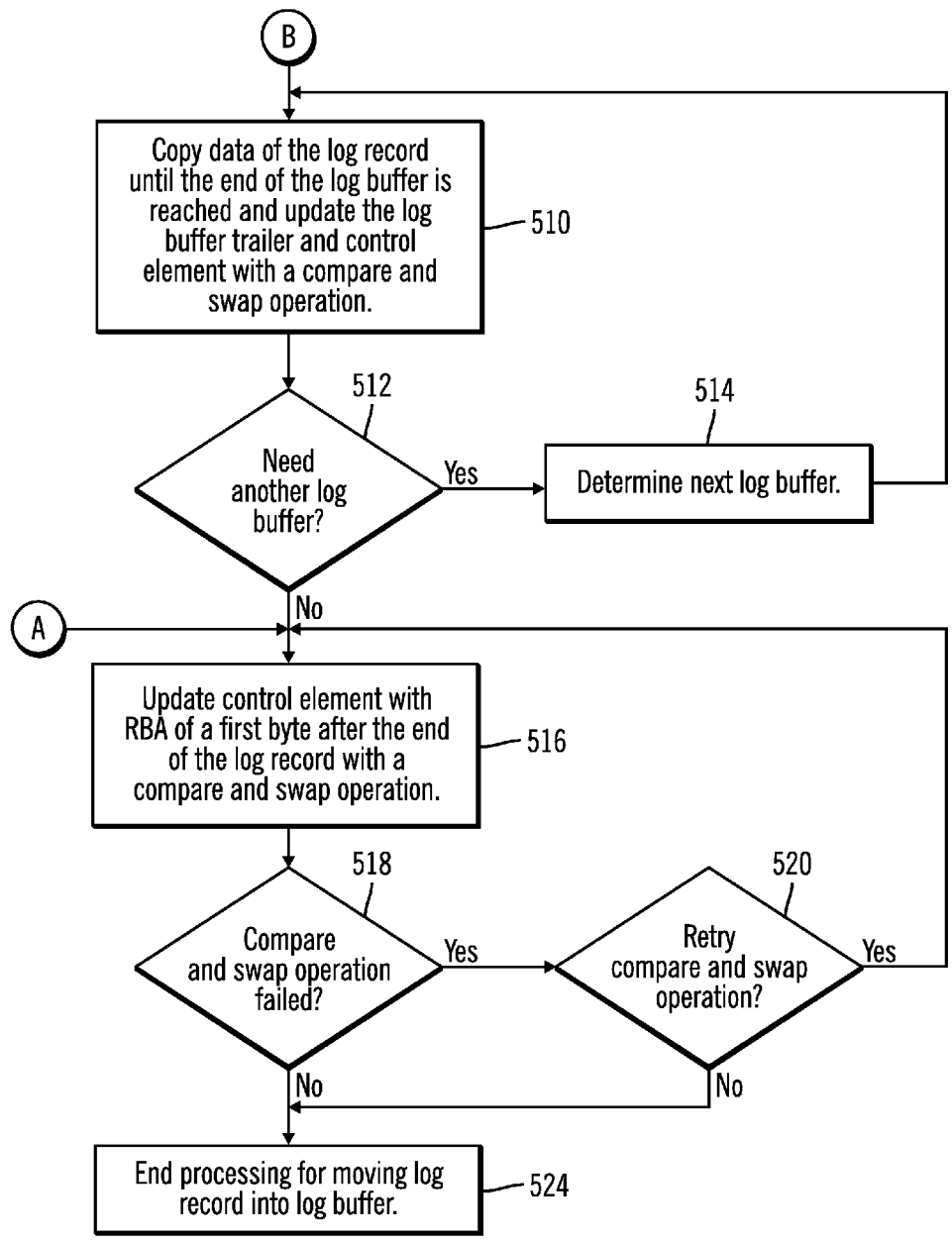

FIG. 5 illustrates, in a flow diagram, logic for moving a log record into a log buffer in accordance with certain embodiments. FIG. 5 is formed by FIGS. 5A and 5B. Control begins at block 500 with the log record sequencer 154 determining whether the log record will fit in the log buffer. If so, processing continues to block 502, otherwise, processing continues to block 510 (FIG. 5B).

In block 502, the log record sequencer 154 copies the log record with a move character operation. In block 504, the log record sequencer 154 updates the information in the log buffer trailer and control element with a compare and swap operation. In block 506, the log record sequencer 154 determines whether the compare and swap operation failed. If so, processing continues to block 508, otherwise, processing continues to block 516 (FIG. 5B).

In block 508, the log record sequencer 154 determines whether to retry the compare and swap operation. If so, processing loops back to block 504, otherwise, processing continues to block 516 (FIG. 5B). In particular, if a log record that is physically after the log record that this user thread is moving into the log buffer has already been moved (i.e., another user thread can start later yet finish sooner), and the other user thread has updated the trailer information, then the compare and swap operation is not retried because the information in the trailer is already most current.

In block 510, the log record sequencer 154 copies the data of the log record until the end of the buffer is reached and updates the log buffer trailer and control element with a compare and swap operation. The control element update also indicates whether the log buffer has been filled and if the log buffer contains the start of a spanned record. In block 512, the log record sequencer 154 determines whether another log buffer is needed to store the log record. If so, processing continues to block 514, otherwise processing continues to block 516. In block 514, the log record sequencer 154 determines the next log buffer (using the logic of FIG. 4). In particular, the log record sequencer 154 performs the processing of FIG. 4 to move to the next buffer and sets information in the control element. The looping of blocks 510-514 repeats as many times as needed to complete the move of the log record into the log buffers.

In block 516, the log record sequencer 154 updates the control element with the RBA of the first byte after the end of the log record with a compare and swap operation. In block 518, the log record sequencer 154 determines whether the compare and swap operation failed. If so, processing continues to block 520, otherwise, processing continues to block 524.

In block 520, log record sequencer 154 determines whether to retry the compare and swap operation. If so, processing loops back to block 516, otherwise, processing continues to block 524. In particular, this updates the RBA value for the end of the log record moved. If this compare and swap operation fails and a log record that is physically before the log record that was just moved was responsible for the update, the compare and swap operation will be retried. If the other log record was physically after the log record that was just moved, then the compare and swap operation is not retried. Thus, the compare and swap operation will either eventually succeed or there will be a situation in which the compare and swap operation does not need to be retried.

In block 524, the log record sequencer 154 ends processing for moving the log record into the log buffer.

Figure 6:
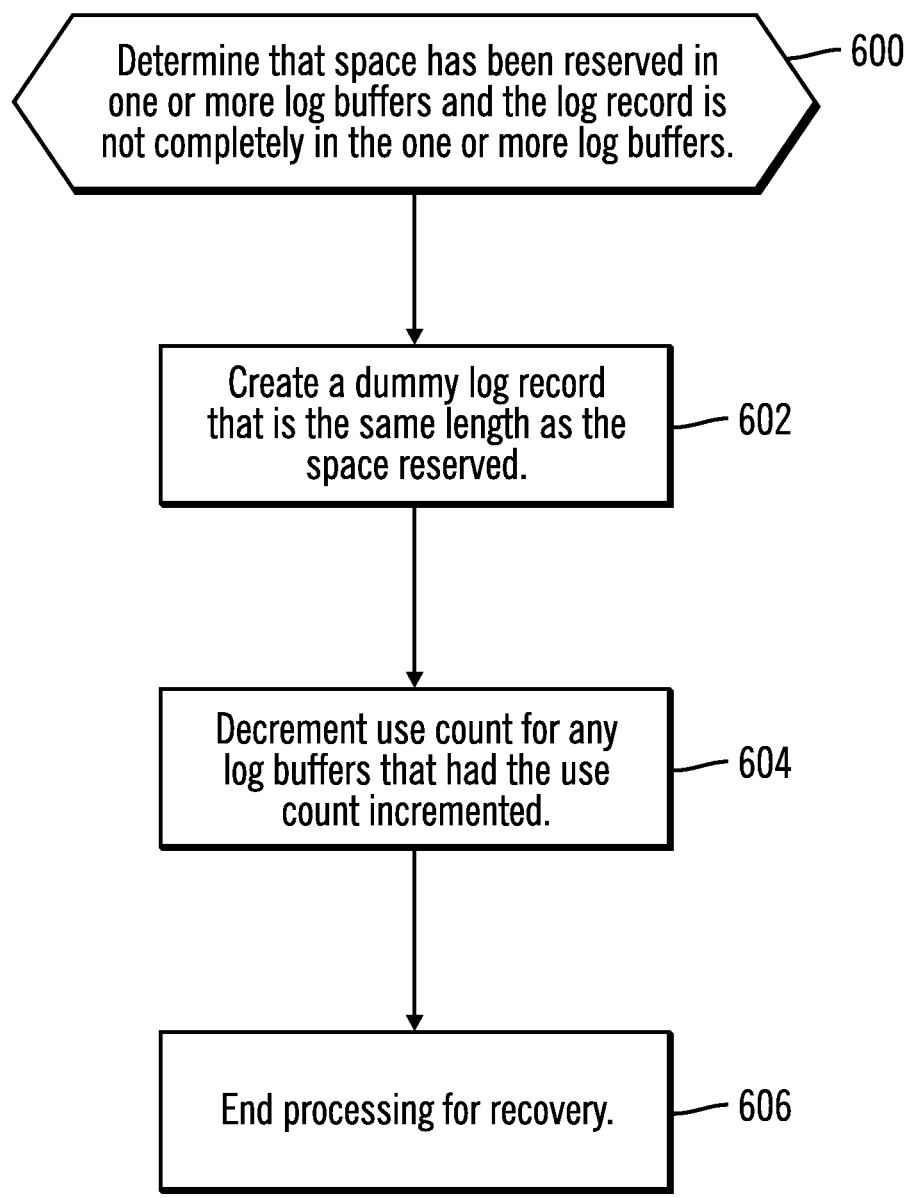
FIG. 6 illustrates, in a flow diagram, logic for recovery in accordance with certain embodiments.

FIG. 6 illustrates, in a flow diagram, logic for recovery in accordance with certain embodiments. The recovery processing occurs if there is an unexpected error in the processing of FIG. 3, 4 or 5. For example, the recovery processing occurs for an asynchronous cancel or failure between the time when space in a log buffer has been reserved for a log record and when the log record is completely in one or more log buffers. Control begins at block 600 with the log record sequencer 154 determining that space has been reserved in one or more log buffers and the log record is not completely copied to one or more log buffers. In block 602, the log record sequencer 154 creates a dummy log record that is the same length as the space reserved. This prevents the creation of a gap in the log records and also ensures that the partial log record is not used. In block 604, the log record sequencer 154 decrements the use count for any log buffers that had the use count incremented. In block 606, the log record sequencer 154 ends processing for recover.

Thus, embodiments eliminate the need for a single latch to provide serialization.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages that support thread concurrency operations (i.e., compare and swap or similar hardware operations), including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Figure 7:
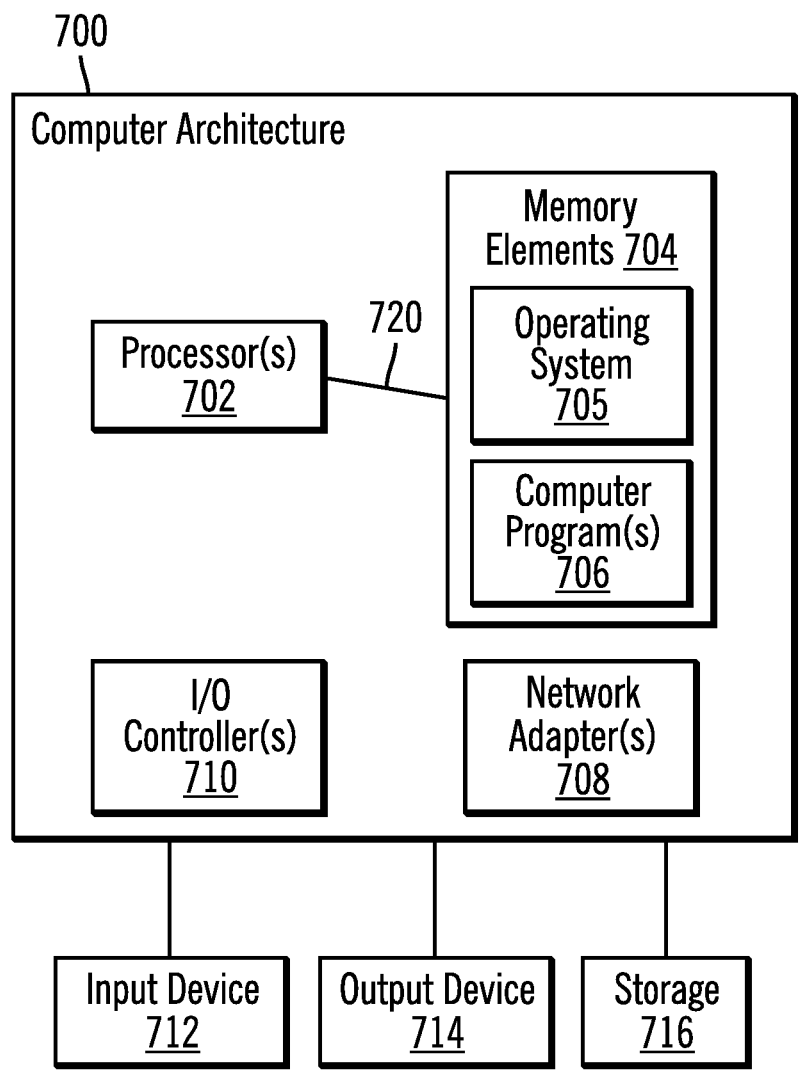
FIG. 7 illustrates a computer architecture that may be used in accordance with certain embodiments.

FIG. 7 illustrates a computer architecture 700 that may be used in accordance with certain embodiments. Computer system 100 may implement computer architecture 700. The computer architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system 705 and one or more computer programs 706.

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The computer architecture 700 may be coupled to storage 716 (e.g., a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and executed by a processor 702 in a manner known in the art.

The computer architecture 700 may include fewer components than illustrated, additional components not illustrated herein, or some combination of the components illustrated and additional components. The computer architecture 700 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention.

In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for ordering a log stream, comprising:
with a computer including a processor, receiving a request to write a log record;
locating a log buffer currently being used;
in response to determining that the log buffer is not full, calculating a current Logical Record Sequence Number (LRSN);
selecting a greater of the current LRSN and a highest LRSN already used for a complete log record in the log buffer;
updating a control element to set a next available space in the log buffer and to update a user count using a first compare and swap operation; and
in response to determining that the first compare and swap operation is successful and that the selected LRSN is greater than an LRSN in the control element,
updating the LRSN for the log record using a second compare and swap operation;
moving the log record to the one or more log buffers;

decrementing the use count in the control element using a third compare and swap operation; and
updating a Relative Byte Address (RBA) in the control element using a fourth compare and swap operation.

2. The method of claim 1, further comprising:
assigning the RBA and the LRSN without using a latch or a lock.

3. The method of claim 1, wherein each of the one or more the log buffers includes log record data comprising one of an entire log record, multiple log records, and a portion of a single log record, and wherein each of the one or more log buffers includes a trailer containing an RBA of a beginning of the log buffers and an LRSN of a last log record in the log buffers.

4. The method of claim 1, further comprising:
determining that the current LRSN is not greater than or equal to a minimum LRSN of the log record; and
stalling the request until the current LRSN is greater than or equal to the minimum LRSN of the log record.

5. The method of claim 1, further comprising:
in response to determining that the log buffer is full,
marking the log buffer as full using a fifth compare and swap operation; and
determining a next log buffer to be used; and
in response to determining that the current log buffer has moved, determining a next log buffer to be used.

6. The method of claim 1, further comprising:
in response to determining that the first compare and swap operation failed, selecting a next log buffer.

7. The method of claim 1, further comprising:
in response to determining that space has been reserved in the one or more log buffers for the log record and the log record is not completely in the one or more log buffers, creating a dummy log record that is a same length as the space that has been reserved during error recovery.

* * * * *